United States Patent [19]

Carmichael

[11] Patent Number: 4,495,404
[45] Date of Patent: Jan. 22, 1985

[54] SELF-CONTAINED COMPACT ELECTRIC BEVERAGE BREWING TRAVEL KIT

[76] Inventor: Wayne E. Carmichael, 7207 Robert Ulrich Ave., Dayton, Ohio 45415

[21] Appl. No.: 423,975

[22] Filed: Sep. 27, 1982

[51] Int. Cl.³ .................... A47J 31/00; A45C 11/20; H05B 3/00

[52] U.S. Cl. ...................... 219/281; 99/279; 99/284; 99/288; 99/290; 206/541; 206/546; 219/202; 219/214; 219/387; 219/437; 219/472; 219/521

[58] Field of Search .............. 219/385–387, 219/202, 214, 432–438, 441, 442, 521, 200, 201, 280, 281, 312, 472; 206/223, 541–549, 553, 514; 99/275, 279, 280, 281, 284, 288, 290, 339, 334, 357; 126/261, 265–267

[56] References Cited

U.S. PATENT DOCUMENTS

| | | | |
|---|---|---|---|
| 1,725,265 | 8/1929 | Glendinning | 206/546 |
| 2,513,218 | 6/1950 | Turnipseed | 219/387 |
| 2,655,255 | 10/1953 | Brown | 206/546 X |
| 2,669,641 | 2/1954 | Becker | 219/387 |
| 2,861,171 | 11/1958 | Adler | 219/202 X |
| 2,883,082 | 4/1959 | Schlumbohm | 206/543 X |
| 3,385,952 | 5/1968 | Mix | 219/387 |
| 3,549,861 | 12/1970 | Trachtenberg et al. | 219/437 X |
| 3,678,246 | 7/1972 | Blachly et al. | 219/437 |
| 3,806,699 | 4/1974 | Hannivig | 219/387 |
| 3,974,358 | 8/1976 | Goltsos | 219/387 |
| 4,037,081 | 7/1977 | Aldridge et al. | 219/387 |
| 4,083,294 | 4/1978 | Petry | 99/279 |
| 4,365,143 | 12/1982 | Kerber | 219/437 X |
| 4,382,402 | 5/1983 | Alvarez | 99/307 X |

Primary Examiner—Anthony Bartis
Attorney, Agent, or Firm—Biebel, French & Nauman

[57] ABSTRACT

A compact self-contained travel kit for brewing a beverage, such as tea, coffee, or the like, includes an open top container which is adapted to receive a small quantity of water to be heated by means of an electric heater element contained in the bottom of the container. A removable insert assembly is received within the container through the open top and provides upwardly open storage compartments for containing the ingredients for making tea or coffee, such as sugar, powdered cream material, coffee, tea or the like, which compartments are closable by lids so that either individual packets or bulk material may be stored. The insert includes a downwardly depending semi-conical portion which is proportioned and adapted to be telescopically received in the uppermost one of a pair of nested drinking cups storable within the container. The nested drinking cups are thus retained in place in a compact manner and are accessible by removal of the insert from the container.

6 Claims, 4 Drawing Figures

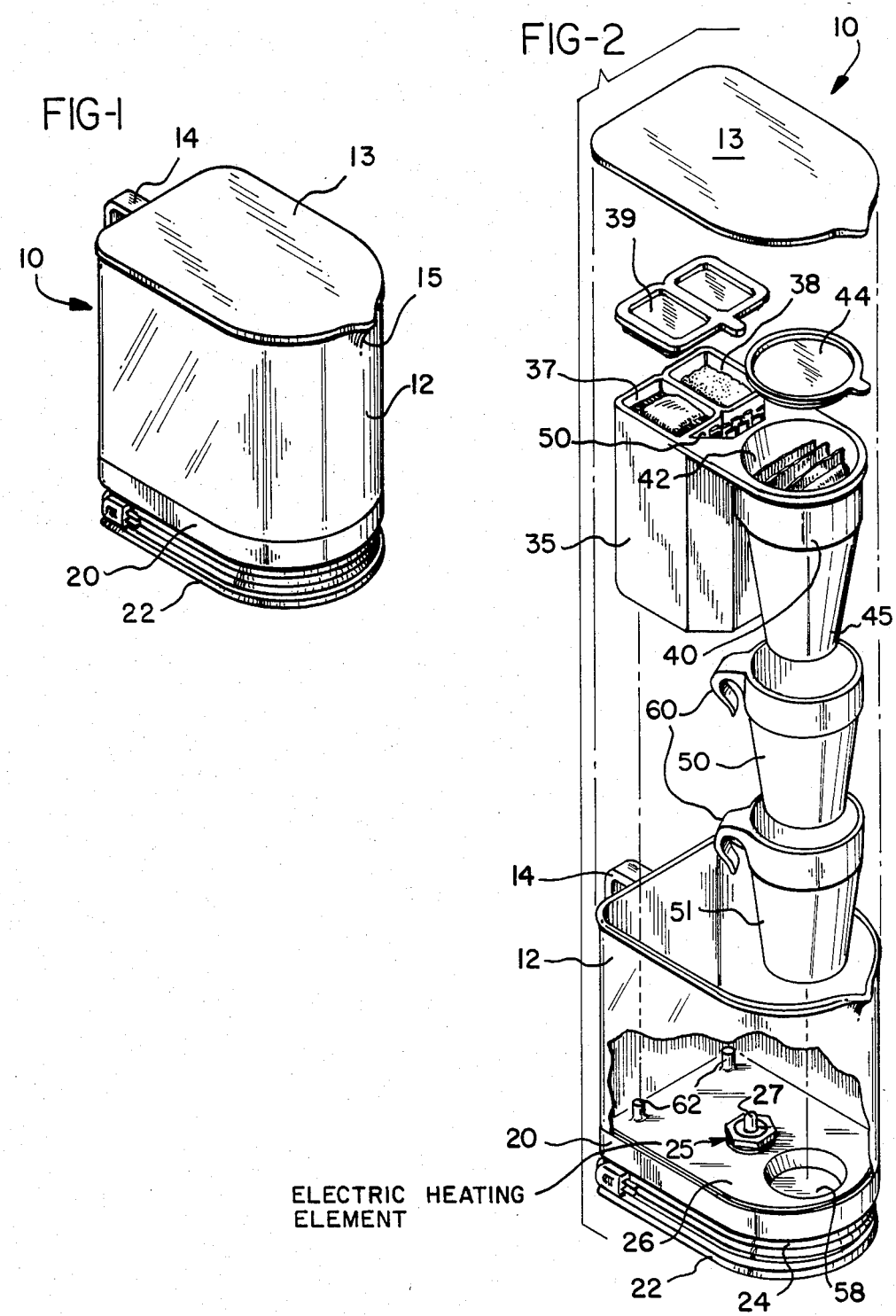

SELF-CONTAINED COMPACT ELECTRIC BEVERAGE BREWING TRAVEL KIT

BACKGROUND OF THE INVENTION

This invention relates to travel kits and more particularly to a compact, self-contained beverage brewing kit, particularly adapted to brewing a small quantity of coffee, tea or the like.

Sportsmen, travelers, yachtsman and the like have need for a small self-contained travel unit which has provision for containing and retaining in packaged or bulk form, various ingredients which may be used in making coffee, tea, or the like, including sugar, cream and a beverage mix such as powdered coffee, or tea, which further includes means for containing cups, assembled within the container and ready for use and/or storage when not in use.

Travel kits which incorporate certain food preparation abilities are known, such as for example, in Aldridge et al, U.S. Pat. No. 4,037,081 of July 19, 1977, showing a lunch bucket with various compartments for flatware and food, as well as a heating element for warming the food. Mix, U.S. Pat. No. 3,385,952 of May 28, 1968 shows another form of an electrically heated lunch box which includes a thermostat and timer for controlling the heater. Other compact travel units are shown in Becker, U.S. Pat. No. 2,669,641 of Feb. 16, 1954 and Turnipseed, U.S. Pat. No. 2,513,218 of June 27, 1950.

As far as I have been able to determine, none of the above defined prior art devices, nor anything known to me on the market, comprises a low-cost, selfcontained beverage making kit which incorporates the advantages of my invention and which permits all necessary elements to be contained in compact form, easy to carry and use.

SUMMARY OF THE INVENTION

The invention is more particularly directed to a compact kit, as previously noted, with all the necessary parts and compartments carried in a container adapted to heat a small quantity of water. For this purpose, the container, which may be molded of plastic, metal or combinations of metal and plastic, is provided with an electric heating element. The heating element material may be designed to operate either on conventional house current, such as 115 volts, or may be designed to operate from 12 or 24 volt power sources for use on boats, in automobiles, or in campers or the like.

The travel kit of my invention further includes a molded insert member which is proportioned to be wholly received within the container when the container is not being used to heat water. Thus, in its travel mode, the insert is received within the container and the insert itself contains a number of compartments which are particularly proportioned and adapted to receive powdered or packaged cream and sugar, stirring sticks and/or spoons, and powdered coffee or tea bags. Preferably, the compartments are proportioned to receive either the prepackaged individual serving portions or to receive the material in loose or bulk form, as the user may desire. The compartments for holding sugar, cream, and/or coffee are preferably provided with tight fitting lids, which are particularly useful in the event that the compartments are used to carry the bulk or powdered form of product.

The insert further has a second portion which is downwardly depending within the container, when the insert is inserted within the container, which portion is itself proportioned to be received within the uppermost one of a plurality of nested serving cups. Preferably two cups are provided (although there may be more or less than two cups), in internested relation with the uppermost cup receiving the downwardly depending portion and the lowermost cup resting at the bottom of the container. In this manner the cups are retained in the most compact form available, while the downwardly depending portion itself may also define a container or compartment for receiving one of the ingredients, such as packaged coffee. The insert thus internests into the uppermost cup and prevents the cups from rattling while locating the same within the container for travel purposes.

It is accordingly an important object of this invention to provide a compact travel kit which is adapted to contain all of the necessary ingredients for brewing a small quantity of coffee, tea or the like, which is easy to carry and compact, and which provides for the storage of the serving cups and for the ingredients used in making such coffee or tea when the same is not in use.

It is a further object of the invention to provide a compact self-contained travel kit which includes a container and an insert for containing coffee, tea and sugar and the like, which insert also serves to locate a pair of cups in telescoped relationship compactly within the kit when the same are not being used, and which container is adapted when the insert and cups are removed to heat a small quantity of water for use in making coffee and the like.

A still further object of the invention is the provision of a compact low cost coffee maker kit for heating a small quantity of water, and which contain provision for storing powdered coffee, sugar and cream within the heater container itself and which also provides for the storage of a pair of cups within the container when the container is not being used to heat water.

These and other objects and advantages of the invention will be apparent from the following description, the accompanying drawings and the appended claims.

BRIEF DESCRIPTION OF THE DRAWINGS

FIG. 1 is a perspective view of the compact self-contained beverage brewing kit of my invention with the cap in place;

FIG. 2 is an exploded view showing the parts thereof;

DESCRIPTION OF PREFERRED EMBODIMENT

Figure 3:
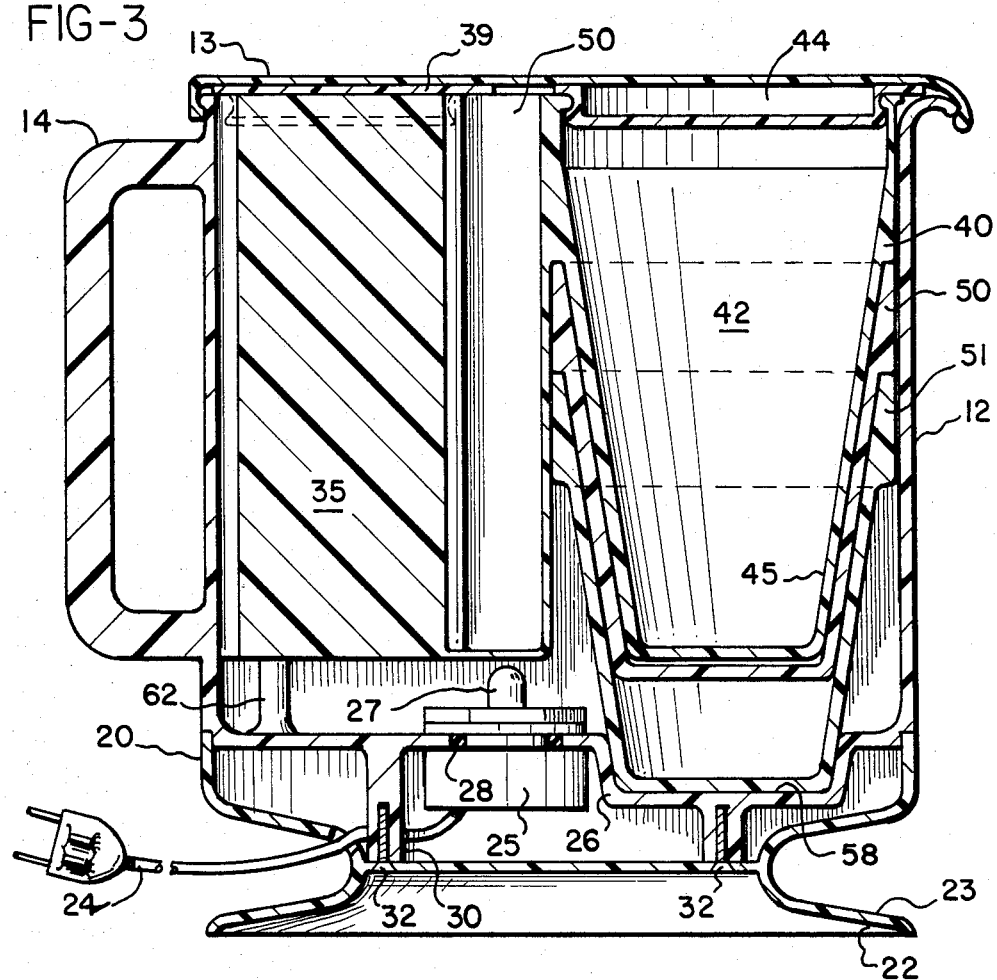
FIG. 3 is an enlarged transverse vertical section through the kit taken generally along the line 3—3 of FIG. 4.

Referring to the figures of the drawing, a compact self-contained travel kit according to my invention is illustrated generally at 10 in FIG. 1 as including a container 12 of molded plastic which is adapted to receive a quantity of water to be heated. A removable cap 13 is received on the container 12 and lightly closes the same against intrusion of dirt, to maintain the contents in usable condition. A lifting handle 14 is formed on the back wall thereof, and a pouring spout 15 is conveniently formed on the upper end of a curved front wall.

The various components and details of the compact travel kit may best be seen by reference to FIGS. 2 and 3. It will be seen that the container 12 is supported on a bottom support member or a false bottom 20, which closes the bottom of the container and provides both a secure circumferential foot 22. The foot forms an outwardly-opening partial recess 23 within which a power cord 24 may be wrapped when the same is not in use. The power cord 24 leads to a heating element 25, and the element 25 is received within a bottom wall 26 of the container 12. The element 25 has a heating element portion 27 extending into the interior of the container 12. The heating element 25 is sealed or closed at the bottom wall 26 by means of an 0-ring 28 or the like. The preferred embodiment shown comprises an all plastic container and the heating element shown has the extended heating element portion 27 isolated within the element and thus isolated from the adjacent walls of the bottom of the container. However, it is within the scope of the invention to provide, where desired, a container having a metal bottom. In such an instance the heating element could be attached directly to the metal bottom or to the underside of the bottom and would not necessarily protrude into the interior of the container.

The heating element 25 is preferably of the known kind which will open and disconnect itself when the heating element portion 27 exceeds a predetermined temperature, such as when all of the water accidentally boils off, or when the unit is plugged in after the water has been poured out of the container 12.

The bottom wall 26 of the container 12 is provided with a pair of downwardly depending integral extrusions 30 which attach to the false bottom 20 by screws 32.

The kit 10 of the present invention also includes an extruded or molded insert 35, as best shown in FIG. 2. The insert 35 is proportioned to form a close fit within the walls of the container 12, and insert 35 provides means for securably containing the ingredients for making coffee or the like. For this purpose the unit is formed with a pair of generally rectangular vertical side-by-side storage compartments 37 and 38 which are proportioned to receive individual packets of cream or sugar or which may also receive cream or sugar in bulk. The compartments 37 and 38 are closed by a removable lid 39. The outer side walls of the insert at the compartments 37 and 38 form a close fit with the corresponding inside walls of the container 12.

Figure 4:
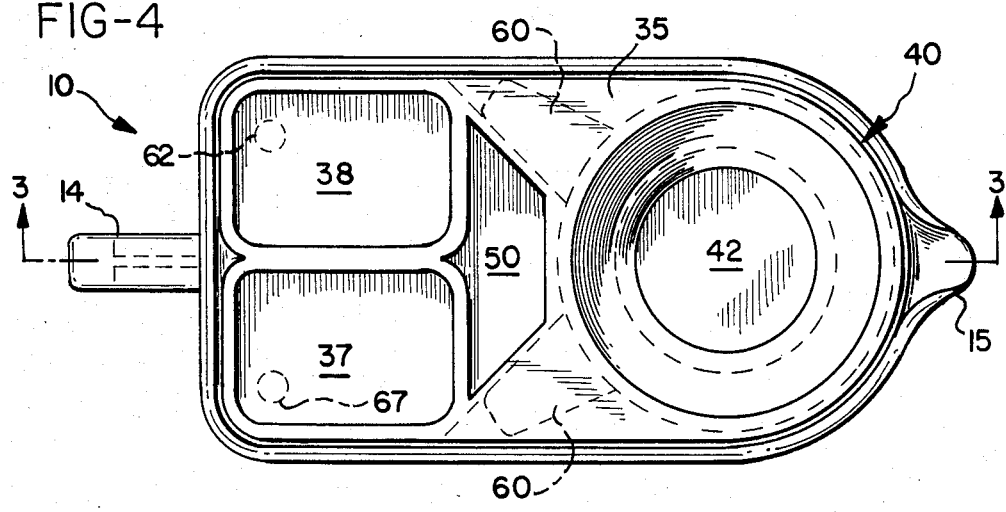
FIG. 4 is a plan view looking down into the kit with the cap and lids removed.

The insert 35 also is formed with a forward depending portion illustrated generally at 40 which similarly forms an upwardly opening storage compartment 42 within which material may be received, such as packets of coffee or loose coffee or tea, or the like. The compartment 42 is likewise securely closed by a lid 44. The portion 40 has a tapered lower end 45 which is adapted to be received within the uppermost of a pair of interfitted or nested cups, such as the cups 50 and 51 shown in FIG. 2. Thus the outer surface of the tapered portion 45 is designed to form a relatively close fit with the interior of the uppermost cup 50, as illustrated in the cross-sectional view of FIG. 3. The lowermost cup 51 has its lower end received within an aligned upwardly opening recess 58 which is formed in the bottom wall 26 of the container 12, for locating the cups and retaining the cups in nested alignment within the container when they are not in use. Further, in order to conserve space, the cup handles 60 are staggered and positioned on either side of the main body portion of the insert 35, as shown by the broken view of the handles in FIG. 4. The vertical space 50 between the pair of compartments 37 and 38 and the larger compartment 42 formed on the forward portion 40 may be used to contain plastic stirring sticks or spoons or the like.

The insert 35 is supported above the heating element by a pair of upwardly extending bosses 62 formed in the bottom 26. In the event the container 12 is formed with a metal bottom or the like, then the supports or bosses 62 could be eliminated by changing the size of the components and the recess 58 or, alternatively, supports for engaging the bottom of the insert 35 could be formed in the side walls of the container. When the insert 35 is in place, it is received entirely within the container 12 so that the cap 13 fully closes the entire contents.

The use of the self-contained beverage brewing and travel kit is largely self-evident from the foregoing description. The user may fill the individual compartments 37, 38, 42 and 50 with such materials as he desires. If the user has available individual packets, the compartments 37 and 38 are particularly designed to receive these packets in the horizontal position. However, if the user prefers, he may fill the compartments with bulk materials; and the lids 39 and 44 with respect to the compartments 37, 38 and 40 assure that the compartments will be sealed in a sanitary manner when the kit is not in use. If required or desired, a removable thin plastic sanitary liner may be included between the insert and the inside walls of the container 12. Such a liner would fit snugly against the inside of the container and between the inside of the container and the insert and the lowermost cup 51, so that the cups and insert would never come into direct contact with the inside of the container.

When the user desires to brew a small quantity of coffee, tea, or the like, the insert 35 is removed, thus exposing for removal the internested cups 50 and 51, which may then be removed. The power cord 24 may be unwrapped from its storage position within the outwardly opening recess or groove 23 formed on the false base or bottom 20. Alternatively, the cord could be enclosed by storing the same within the base 20 by providing a compartment to contain the cord, or by sliding a cover over the container which would temporarily contain the cord within the base or within a recess on the base.

The quantity of water desired is then added to the interior of the container, the unit is plugged into a suitable source of power, and the water is heated by the heating element 25 to the desired temperature. After the unit has been used, and remaining hot water may be poured out of the container and the parts reassembled therein and the lid 13 replaced. In this manner a camper or traveler can quickly and conveniently obtain a cup of coffee or the like with a minimum of trouble. When the internested cups 50 and 51 are replaced, and the forward conical portion 45 of the insert is inserted therein, the parts fit relatively close so that there is a minimum of opportunity for rattle and dislodgement.

If desired, a timer device may be incorporated into the unit which could control both the on and off time, if desired, and the length of time which the unit is turned on, for safety and for convenience reasons. All of the parts are designed to be made at relatively low cost by suitable molding or injection methods.

If required or desired, a lid for the container 12 could be included to prevent the spilling of hot water when the cap 13, the insert 35, and the cups are removed. Such a lid would cover the top of the container, excluding the spout 15, and could fit between the top of the container and the cap 13 and slide down into the container between the inside of the container and the insert 35 for storage.

While the form of apparatus herein described constitutes a preferred embodiment of this invention, it is to be understood that the invention is not limited to this precise form of apparatus, and that changes may be made therein without departing from the scope of the invention.

What is claimed is:

1. A travel hot water heater and coffee maker kit comprising:

an open-top container having a forward part and a rearward part and adapted to receive therein a quantity of water for heating, means in the bottom of said container defining an electric heater for heating water therein, a removable insert assembly receivable within said container through said open top for transporting and storing ingredients necessary to make coffee, including a housing having an forward tapered portion adapted to be received in the forward part of said container and an upwardly opening portion adapted to be received in the rearward part of said container, at least one cup adapted to be received within said container in telescopic relation to said forward tapered portion with said tapered portion received in said cup, said insert having means therein defining compartments for receipt and separate storage of sugar, cream, coffee, and the like, and means defining a cover for closing the open top of said container with said insert and cup received therein.

2. A travel hot water heater and coffee maker kit comprising:

an open top container having a forward portion and a rearward portion adapted to receive therein a quantity of water for heating, means in the bottom of said container defining an electric heater for heating water therein, a removable insert assembly receivable within said container through said open top for transporting and storing ingredients necessary to make coffee, including a housing having an upwardly opening tapered portion adapted to be received in the forward portion of said container and an integral upwardly opening rectangular portion adapted to be received in the rearward portion of said container, at least two cups adapted to be received within said container in telescopic relation to said forward tapered portion with said forward tapered portion received in one of said cups and the other of said cups received in said one cup in nesting relation within said container, said rectangular rearward portion having means therein defining compartments for receipt and separate storage of sugar and cream parcels or the like, and means defining a cover for closing the open top of said container with said insert and nested cups received therein.

3. A compact travel kit for making a beverage such as tea or coffee, and for containing cups and ingredients, comprising:

a container adapted to receive a quantity of water to be heated, said container being open at the top and having side walls, a bottom, a front wall having means thereon defining a pouring spout, and a back wall having means thereon defining a lifting handle, heater means in said bottom for heating water in said container, an insert removably receivable within said container through said open top, means in said insert defining a plurality of upwardly opening storage compartments, means on said insert defining a downwardly depending member adapted to be received in the uppermost one of a plurality of nested cups for retaining and locating the cups within said container.

4. The kit of claim 3 further comprising a pair of nested cups, the uppermost one being received over said insert, means in said bottom wall defining a recess in registration with the lowermost cup for locating said nested cups.

5. The kit of claim 3 further comprising means defining removable closure members for said compartments.

6. The kit of claim 3 in which said downwardly depending member further defines an upwardly open storage compartment.

* * * * *